United States Patent
Hotta et al.

(10) Patent No.: US 12,359,928 B2
(45) Date of Patent: Jul. 15, 2025

(54) VEHICLE DISPATCH SYSTEM, TRAVELING ROUTE GENERATION METHOD, AND NON-TRANSITORY COMPUTER READABLE RECORDING MEDIUM

(71) Applicant: TOYOTA JIDOSHA KABUSHIKI KAISHA, Toyota (JP)

(72) Inventors: Daichi Hotta, Tokyo-to (JP); Yusuke Hayashi, Susono (JP); Taichi Kawanai, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 238 days.

(21) Appl. No.: 18/323,627

(22) Filed: May 25, 2023

(65) Prior Publication Data

US 2024/0027210 A1    Jan. 25, 2024

(30) Foreign Application Priority Data

Jul. 25, 2022    (JP) .................................. 2022-118094

(51) Int. Cl.
  G01C 21/34    (2006.01)
  B60W 60/00    (2020.01)
  G06Q 10/0631    (2023.01)

(52) U.S. Cl.
  CPC ....... *G01C 21/3461* (2013.01); *B60W 60/001* (2020.02); *G06Q 10/06311* (2013.01); *B60W 2555/20* (2020.02)

(58) Field of Classification Search
  CPC ............ G01C 21/3461; B60W 60/001; B60W 2555/20; G06Q 10/06311
  See application file for complete search history.

(56) References Cited

U.S. PATENT DOCUMENTS

| | | | |
|---|---|---|---|
| 12,062,290 B1* | 8/2024 | Grace | H04W 4/025 |
| 2018/0267536 A1* | 9/2018 | Goldberg | G05D 1/0212 |
| 2018/0275661 A1* | 9/2018 | Glaser | G06Q 50/40 |
| 2019/0049968 A1* | 2/2019 | Dean | G05D 1/0255 |
| 2019/0176837 A1* | 6/2019 | Williams | G06V 20/593 |
| 2020/0191582 A1* | 6/2020 | Urano | G05D 1/0088 |

(Continued)

FOREIGN PATENT DOCUMENTS

| | | | |
|---|---|---|---|
| CN | 111523702 A | * | 8/2020 |
| JP | 2020106525 A | | 7/2020 |
| JP | 2021043058 A | | 3/2021 |

OTHER PUBLICATIONS

Machine translation for CN111523702A, Aug. 11, 2020, Gao Yi.*

*Primary Examiner* — Abdalla A Khaled
(74) *Attorney, Agent, or Firm* — Dinsmore & Shohl LLP

(57) ABSTRACT

A vehicle dispatch system for dispatching an autonomous vehicle in accordance with a vehicle dispatch request is proposed. The vehicle dispatch system is configured to execute generating a transportation route from a pick-up point to a destination point, generating a plurality of candidate dispatch routes for a dispatch route from a current point of the autonomous vehicle to the pick-up point, calculating a degree of overlap between the transportation route and the dispatch route for each of the plurality of candidate dispatch routes, selecting the dispatch route from the plurality of candidate dispatch routes based on the degree of overlap, and causing the autonomous vehicle to travel along the dispatch route and the transportation route.

5 Claims, 8 Drawing Sheets

(56) References Cited

U.S. PATENT DOCUMENTS

2021/0333117 A1\* 10/2021 Urano .................. G05D 1/0088
2021/0381842 A1\* 12/2021 Nishimura ............... G08G 1/00
2022/0092718 A1\* 3/2022 Lynch .................... G06Q 50/40

\* cited by examiner

VEHICLE DISPATCH SYSTEM, TRAVELING ROUTE GENERATION METHOD, AND NON-TRANSITORY COMPUTER READABLE RECORDING MEDIUM

CROSS-REFERENCE TO RELATED APPLICATION

The present application claims priority under 35 U.S.C. § 119 to Japanese Patent Application No. 2022-118094, filed Jul. 25, 2022, the contents of which application are incorporated herein by reference in their entirety.

BACKGROUND

Technical Field

The present disclosure relates to a technique for dispatching an autonomous vehicle based on a vehicle dispatch request. In particular, the present disclosure relates to a technique for generating a traveling route of an autonomous vehicle to be dispatched.

Background Art

Patent Literature 1 discloses a method for route planning for an autonomous vehicle comprising determining whether a stall factor is present during a traveling route to a destination, determining whether an occupant is present in the autonomous vehicle during the traveling route to the destination, determining an alternate traveling route when the stall factor is present and when no occupant is present, and controlling the autonomous vehicle to travel on the alternate traveling route when the alternate traveling route does not include a stall factor.

In addition, there is the following Patent Literature 2 as a document showing the technical level of the technical field according to the present disclosure.

LIST OF RELATED ART

Patent Literature 1: JP 2020/106525 A
Patent Literature 2: JP 2021/043058 A

SUMMARY

In recent years, in view of operation as demand-responsive transport (DRT) and mobility-as-a-service (Maas), a vehicle dispatch system which dispatches an autonomous vehicle based on a vehicle dispatch request has been considered. In the vehicle dispatch system, typically, a traveling route is generated in response to the vehicle dispatch request, and the autonomous vehicle is dispatched so as to travel along the generated traveling route. In the vehicle dispatch system, in order to ensure serviceability, it is required that a traveling route from a pick-up point of an autonomous vehicle to a destination point does not include a point at which the autonomous vehicle cannot continue traveling or a point at which traveling is not desirable from the viewpoint of safety or the like (hereinafter also referred to as an "avoidance point").

By adopting the method disclosed in Patent Literature 1, when it can be determined that there is an avoidance point on a traveling route from information that can be used in advance, the autonomous vehicle can select an alternate traveling route that does not include the avoidance point. However, it is not possible to deal with a case where an avoidance point occurs due to a dynamic factor or a real-time factor (for example, an accident, impassable due to a temporarily stopped vehicle, or traffic congestion). For this reason, the autonomous vehicle may be stuck on the traveling route from the vehicle avoidance point to the destination point due to the avoidable point caused by a dynamic factor or a real-time factor. As a result, there is a possibility that serviceability will be degraded, for example the arrival time will be delayed.

In view of the above problem, an object of the present disclosure is to provide a technique for dispatching an autonomous vehicle in response to a vehicle dispatch request, which is capable of reducing a situation in which an avoidance point is included in a traveling route from a pick-up point to a destination point.

A first disclosure is directed to a vehicle dispatch system.
The vehicle dispatch system according to the first disclosure comprises:
one or more processors; and
a memory storing executable instructions.
The executable instructions, when executed by the one or more processors, cause the one or more processors to execute:
acquiring a vehicle dispatch request of an autonomous vehicle;
generating a transportation route which is a traveling route from a pick-up point to a destination point in accordance with the vehicle dispatch request;
generating a plurality of candidate dispatch routes for a dispatch route which is a traveling route from a current point of the autonomous vehicle to the pick-up point;
calculating a degree of overlap between the transportation route and the dispatch route for each of the plurality of candidate dispatch routes;
selecting the dispatch route from the plurality of candidate dispatch routes based on the degree of overlap; and
causing the autonomous vehicle to travel along the dispatch route and the transportation route.

A second disclosure is directed to a vehicle dispatch system including the following features with respect to the vehicle dispatch system according to the first disclosure.
The instructions further cause the one or more processors to execute:
acquiring environment information of the traveling route;
determining, based on the environment information, whether or not the transportation route includes an avoidance point where the autonomous vehicle should avoid passing through; and
changing the transportation route so as not to include the avoidance point when it is determined that the transportation route includes the avoidance point.

A third disclosure is directed to a vehicle dispatch system including the following features with respect to the vehicle dispatch system according to the second disclosure.
The autonomous vehicle comprises a sensor detecting surrounding environment information, and
the environment information includes the surrounding environment information detected by the sensor while the autonomous vehicle travels on the dispatch route.

A fourth disclosure is directed to a vehicle dispatch system including the following features with respect to the vehicle dispatch system according to any of the first to third disclosure.
The vehicle dispatch request includes a pick-up request time at which the autonomous vehicle arrives at the pick-up point, and the generating the plurality of candidate dispatch routes includes generating the plurality of candidate dispatch routes such that at least the autonomous vehicle arrives in time for the pick-up request time.

A fifth disclosure is directed to a vehicle dispatch system including the following features with respect to the vehicle dispatch system according to any of the first to third disclosure.

The generating the transportation route includes:
generating a plurality of candidate transportation routes for a traveling route from the pick-up point to the destination point in accordance with the vehicle dispatch request;
calculating estimated travel time of the autonomous vehicle for each of the plurality of candidate transportation routes; and
selecting the transportation route from the plurality of candidate transportation routes based on a degree of shortness of the estimated travel time.

A sixth disclosure is directed to a traveling route generation method for generating, by a computer, a traveling route of an autonomous vehicle in accordance with a vehicle dispatch request.

The traveling route generation method according to the sixth disclosure comprises:
generating a transportation route which is a traveling route from a pick-up point to a destination point in accordance with the vehicle dispatch request;
generating a plurality of candidate dispatch routes for a dispatch route which is a traveling route from a current point of the autonomous vehicle to the pick-up point;
calculating a degree of overlap between the transportation route and the dispatch route for each of the plurality of candidate dispatch routes; and
selecting the dispatch route from the plurality of candidate dispatch routes based on the degree of overlap.

A seventh disclosure is directed to a traveling route generation method including the following features with respect to the traveling route generation method according to the sixth disclosure.

The traveling route generation method further comprises:
acquiring environment information of the traveling route;
determining, based on the environment information, whether or not the transportation route includes an avoidance point where the autonomous vehicle should avoid passing through; and
changing the transportation route so as not to include the avoidance point when it is determined that the transportation route includes the avoidance point.

An eighth disclosure is directed to a traveling route generation method including the following features with respect to the traveling route generation method according to the seventh disclosure.

The autonomous vehicle comprises a sensor detecting surrounding environment information, and
the environment information includes the surrounding environment information detected by the sensor while the autonomous vehicle travels on the dispatch route.

A ninth disclosure is directed to a vehicle dispatch program for dispatching an autonomous vehicle in accordance with a vehicle dispatch request.

The vehicle dispatch program according to the ninth disclosure, when executed by a computer, causes the computer to execute:
generating a transportation route which is a traveling route from a pick-up point to a destination point in accordance with the vehicle dispatch request;
generating a plurality of candidate dispatch routes for a dispatch route which is a traveling route from a current point of the autonomous vehicle to the pick-up point;
calculating a degree of overlap between the transportation route and the dispatch route for each of the plurality of candidate dispatch routes;
selecting the dispatch route from the plurality of candidate dispatch routes based on the degree of overlap; and
causing the autonomous vehicle to travel along the dispatch route and the transportation route.

A tenth disclosure is directed to a vehicle dispatch program including the following features with respect to the vehicle dispatch program according to the ninth disclosure.

The vehicle dispatch program, when executed by the computer, further causes the computer to execute:
acquiring environment information of the traveling route;
determining, based on the environment information, whether or not the transportation route includes an avoidance point where the autonomous vehicle should avoid passing through; and
changing the transportation route so as not to include the avoidance point when it is determined that the transportation route includes the avoidance point.

An eleventh disclosure is directed to a vehicle dispatch program including the following features with respect to the vehicle dispatch program according to the tenth disclosure.

The autonomous vehicle comprises a sensor detecting surrounding environment information, and
the environment information includes the surrounding environment information detected by the sensor while the autonomous vehicle travels on the dispatch route.

According to the present disclosure, the dispatch route is selected based on the degree of overlap to the transportation route. It is thus possible to determine whether or not the avoidance point is included in the transportation route from surrounding environment detected while the autonomous vehicle is traveling on the dispatch route. As a result, it is possible to determine the avoidance point in the transportation route caused by a dynamic factor or a real-time factor, and to reduce inclusion of the avoidance point in the transportation route.

EMBODIMENTS

1. Outline

Figure 1:
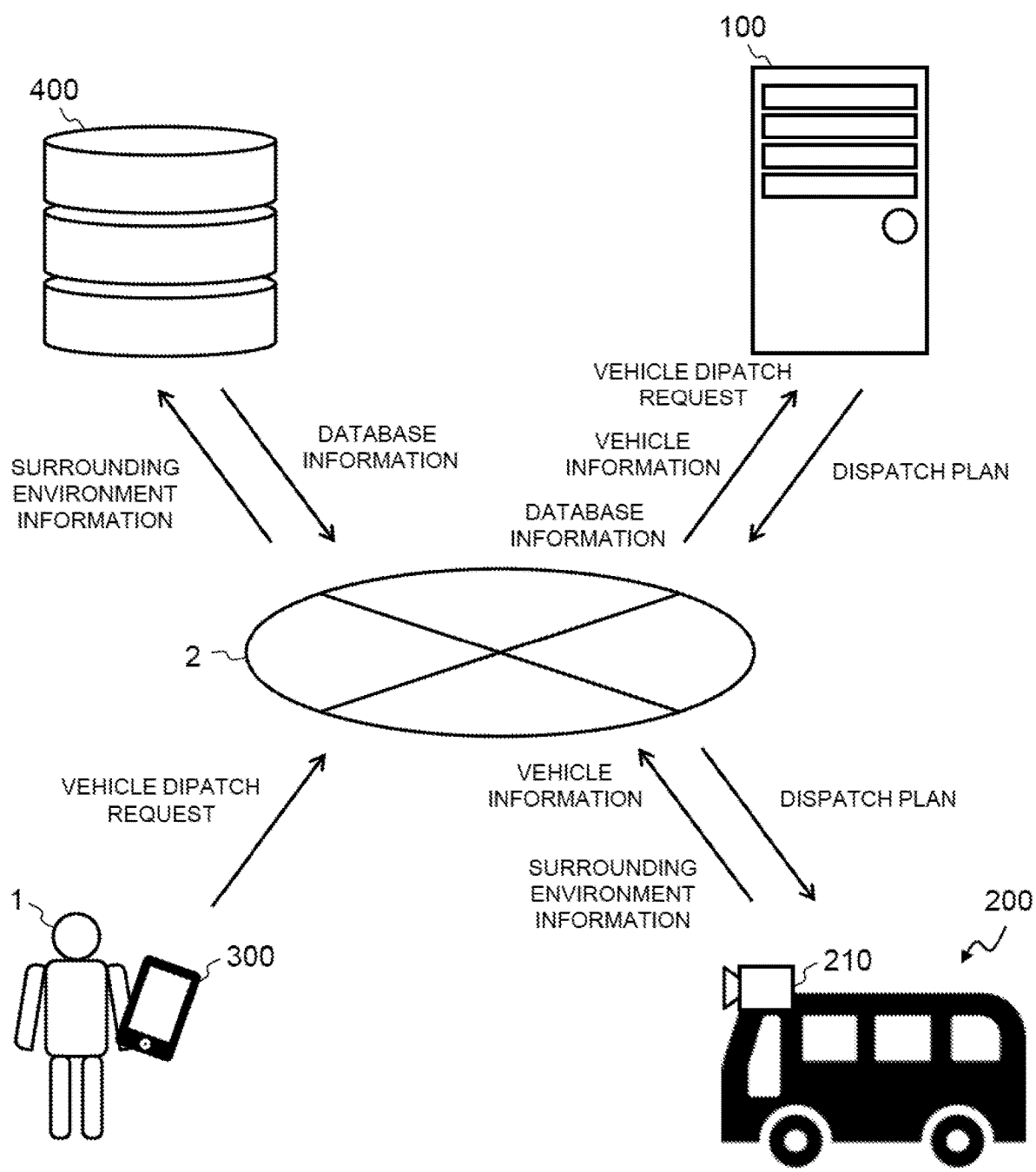
FIG. 1 is a conceptual diagram for explaining an outline of a vehicle dispatch system according to the present embodiment.

The following will describe an outline of a vehicle dispatch system according to the present embodiment. FIG. 1 is a conceptual diagram for explaining an outline of a vehicle dispatch system 10 according to the present embodiment. The vehicle dispatch system 10 provides a vehicle dispatch service that receives a vehicle dispatch request from a user 1 and dispatches an autonomous vehicle 200 in accordance with the vehicle dispatch request. The vehicle dispatch system 10 according to the present embodiment includes a vehicle dispatch server 100, the autonomous vehicle 200, a user device 300, and a database server 400. The vehicle dispatch server 100, the autonomous vehicle 200, the user device 300, and the database server 400 are connected to a communication network 2 and are configured to be able to transmit/receive information to/from each other. The communication network 2 is constituted by, for example, a mobile communication network and the Internet.

User device 300 receives an input of the vehicle dispatch request. That is, the user 1 inputs the vehicle dispatch request by operating the user device 300. The vehicle dispatch request includes information regarding at least a pick-up point, a destination point, and a pick-up request time at which the autonomous vehicle 200 arrives at the pick-up point. The pick-up point is typically a point at which the user 1 desires to board the autonomous vehicle 200. The destination point is typically a destination desired by the user 1 and is a point at which the user 1 gets off the autonomous vehicle 200. The pick-up request time is typically a time at which the user 1 desires to board the autonomous vehicle 200. The user device 300 transmits the received vehicle dispatch request to the vehicle dispatch server 100 via the communication network 2.

The vehicle dispatch server 100 acquires the vehicle dispatch request via the communication network 2 and generates a dispatch plan in response to the vehicle dispatch request. The dispatch plan includes information regarding at least a traveling route which defines a route along which the autonomous vehicle 200 travels. That is, the vehicle dispatch server 100 executes at least a process of generating a traveling route (hereinafter also referred to as a "traveling route generation process").

In the traveling route generation process, the vehicle dispatch server 100 generates a traveling route according to the vehicle dispatch request based on information acquired from the autonomous vehicle 200 (vehicle information) and information acquired from the database server 400. The vehicle information includes at least position information of the autonomous vehicle 200. The vehicle information may further include information regarding a traveling state (for example, a vehicle speed) of the autonomous vehicle 200.

The dispatch plan may also include other information regarding the dispatch of the autonomous vehicle 200. For example, the dispatch plan may include information regarding a time to start dispatching the autonomous vehicle 200. The vehicle dispatch server 100 transmits the generated dispatch plan to the autonomous vehicle 200 via the communication network 2.

The database server 400 manages various databases related to information necessary for providing the vehicle dispatch service. Examples of the database managed by the database server 400 include a database regarding map information (map database) and a database regarding environment information (for example, road traffic information) of a route on a map (environment database). That is, examples of the database information acquired by the vehicle dispatch server 100 include map information related to the map database and environment information related to the environment database.

The autonomous vehicle 200 acquires the dispatch plan via the communication network 2, and autonomously travels in accordance with the dispatch plan. In particular, the autonomous vehicle 200 is configured to perform autonomous driving along a traveling route. The vehicle dispatch service by the vehicle dispatch system 10 is realized by the autonomous vehicle 200 autonomously traveling in accordance with the vehicle dispatch plan. However, the autonomous vehicle 200 may be configured to be able to be driven by an operation of the driver.

The autonomous vehicle 200 includes a sensor 210 that detects surrounding environment of the autonomous vehicle 200. Examples of the sensor 210 include a camera, a millimeter-wave radar, and a LiDAR. Then, the autonomous vehicle 200 transmits surrounding environment information detected by the sensor 210 to the database server 400. The surrounding environment information may include not only information directly detected by the sensor 210 but also information recognized based on the information detected by the sensor 210. For example, the surrounding environment information may include a position and a type of an obstacle (for example, a vehicle parked on shoulder, a construction section, or the like) detected by the sensor 210, presence or absence of a deviation between the map information and the traveling route, a change between the map information and a structure detected by the sensor 210, or the like.

The database server 400 manages the surrounding environment information acquired from the autonomous vehicle 200 as a database. For example, the database server 400 manages the surrounding environment information in the environment database as one of the surrounding environment information of a route on the map. The autonomous vehicle 200 transmits the vehicle information to the vehicle dispatch server 100 via the communication network 2. Therefore, the autonomous vehicle 200 is configured to be able to acquire the vehicle information.

As described above, the vehicle dispatch system 10 according to the present embodiment is configured. Note that the vehicle dispatch server 100 and the database server 400 may be integrally configured. For example, the database server 400 may be implemented as a memory of the vehicle dispatch server 100. In this case, the vehicle dispatch server 100 has a function of managing various databases in the memory. And the autonomous vehicle 200 transmits the surrounding environment information to the vehicle dispatch server 100, and the vehicle dispatch server 100 stores the surrounding environment information acquired via the communication network 2 in the memory.

The vehicle dispatch system 10 according to the present embodiment is characterized by the traveling route generation process executed by the vehicle dispatch server 100. The following will describe an outline of the traveling route generation process executed by the vehicle dispatch server 100.

Figure 2:
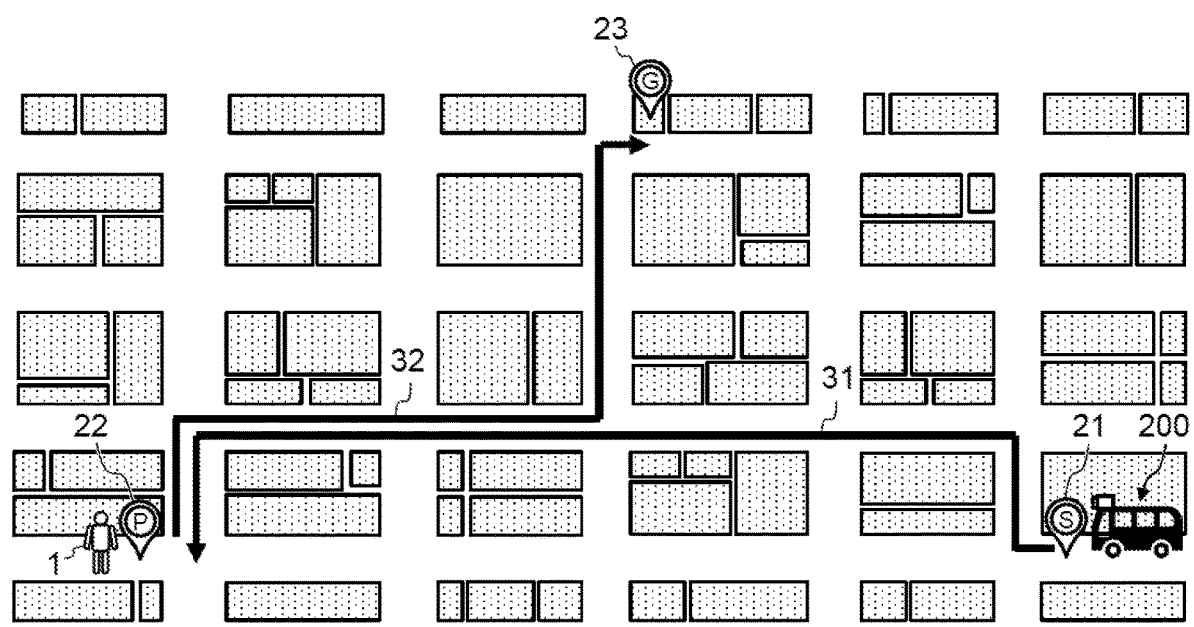
FIG. 2 is a conceptual diagram showing an example of traveling routes generated by a vehicle dispatch server.

The traveling route generated by the vehicle dispatch server 100 in the traveling route generation process is classified into two. One is a traveling route (hereinafter, also referred to as a "dispatch route") from a current point of the autonomous vehicle 200 to a pick-up point, and the other is a traveling route (hereinafter, also referred to as a "transportation route") from the pick-up point to a destination point. Since the transportation route is a traveling route to the destination point, it can also be referred to as a "destination route". FIG. 2 shows an example of a traveling route generated by the vehicle dispatch server 100 in the traveling route generation process. In FIG. 2, a dispatch route 31, which is a traveling route from a current point 21 to a pick-up point 22, and a transportation route 32, which is a traveling route from the pick-up point 22 to a destination point 23, are shown on a map.

One of the features of the traveling route generation process executed by the vehicle dispatch server 100 is that the dispatch route 31 is selected based on a degree of overlap to the transportation route 32. This feature will be described with reference to FIG. 3.

First, the vehicle dispatch server 100 generates the transportation route 32. The vehicle dispatch server 100 may generate a plurality of traveling routes (hereinafter, also referred to as a "plurality of candidate transportation routes") from the pick-up point 22 to the destination point 23 based on the database information. In this case, the vehicle dispatch server 100 may be configured to select the transportation route 32 from the plurality of candidate transportation routes. For example, the transportation route 32 is selected from the plurality of transportation candidate routes using an estimated travel time which is an estimated time it will take the autonomous vehicle 200 to travel from the pick-up point 22 to the destination point 23. In this case, the vehicle dispatch server 100 may be configured to calculate the estimated travel time for each of the plurality of candidate transportation routes. Then, the vehicle dispatch server 100 may select, as the transportation route 32, a traveling route having the shortest estimated travel time among the plurality of candidate transportation routes.

Figure 3:
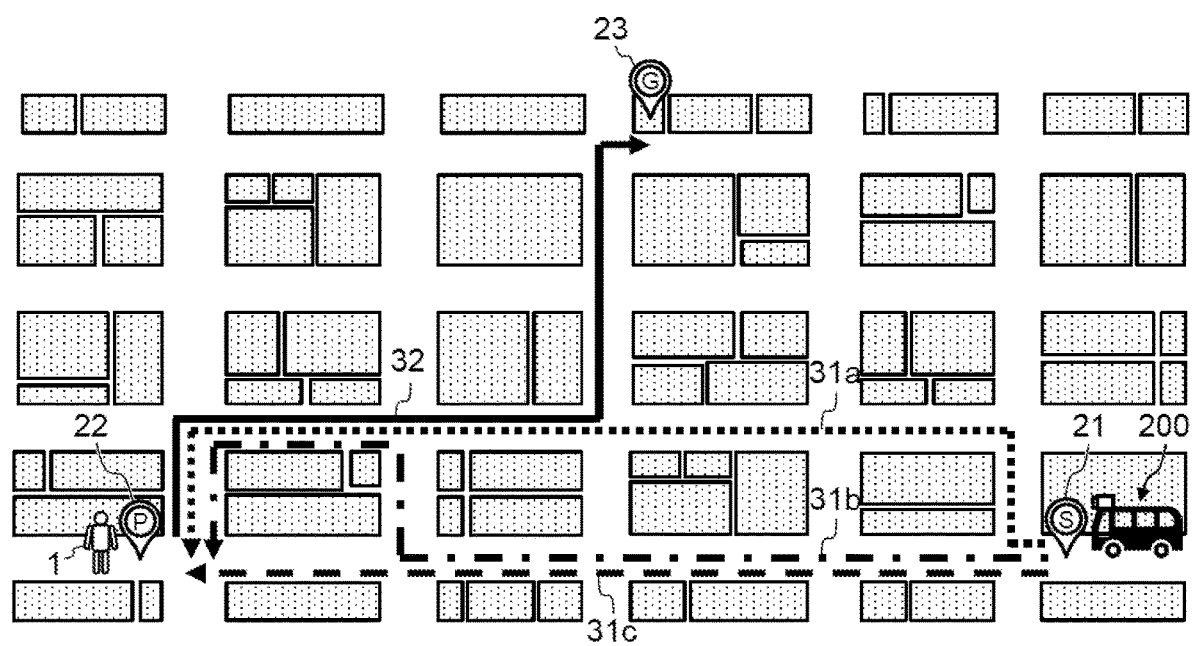
FIG. 3 is a conceptual diagram for explaining a process executed by the vehicle dispatch server.

Next, the vehicle dispatch server 100 generates a plurality of traveling routes (hereinafter, also referred to as a "plurality of candidate dispatch routes") from the current point 21 to the pick-up point 22. The vehicle dispatch server 100 generates the plurality of vehicle candidate dispatch routes based on the database information such that at least the autonomous vehicle 200 arrives in the pick-up request time given by the vehicle dispatch request. For example, the vehicle dispatch server 100 generates, as the plurality of vehicle dispatch candidate routes, traveling routes in which the estimated time it will take the autonomous vehicle 200 to travel from the current point 21 to the pick-up point 22 is shorter than the time period between the current time and the pick-up request time. FIG. 3 shows three candidate dispatch routes 31a, 31b, and 31c.

Next, the vehicle dispatch server 100 calculates, for each of the plurality of candidate dispatch routes, a degree of overlap to the transportation route 32. The degree of overlap shows how much the routes overlap each other. Then the degree of overlap can also be referred to as a "coincidence degree". For example, the vehicle dispatch server 100 calculates, for each of the plurality of candidate dispatch routes, a ratio of overlapping parts to the transportation route 32 as the degree of overlap. In this case, the degree of overlaps of the three candidate dispatch routes 31a, 31b, and 31c shown in FIG. 3 are about 60%, 40%, and 0%, respectively.

Next, the vehicle dispatch server 100 selects the dispatch route 31 from the plurality of candidate dispatch routes based on the degree of overlap. Particularly, the vehicle dispatch server 100 may select, as the dispatch route 31, a traveling route having the highest degree of overlap among the plurality of candidate dispatch routes. For example, in the case shown in FIG. 3, since the candidate dispatch route 31a has the highest degree of overlap among the three candidate dispatch routes, the vehicle dispatch server 100 selects the candidate dispatch route 31a as the dispatch route 31.

The vehicle dispatch server 100 transmits the selected dispatch route 31 to the autonomous vehicle 200 as the dispatch plan.

Another feature of the traveling route generation process executed by the vehicle dispatch server 100 is to determine whether or not the transportation route 32 includes an avoidance point, and to change the transportation route 32 so as not to include the avoidance point when it is determined that the transportation route 32 includes the avoidance point. In particular, the determining whether or not the avoidance point is included in the transportation route 32 is performed based on the surrounding environment information detected by the sensor 210 while the autonomous vehicle traveling vehicle 200 travels on the dispatch route 31. This feature will be described with reference to FIG. 4.

Figure 4:
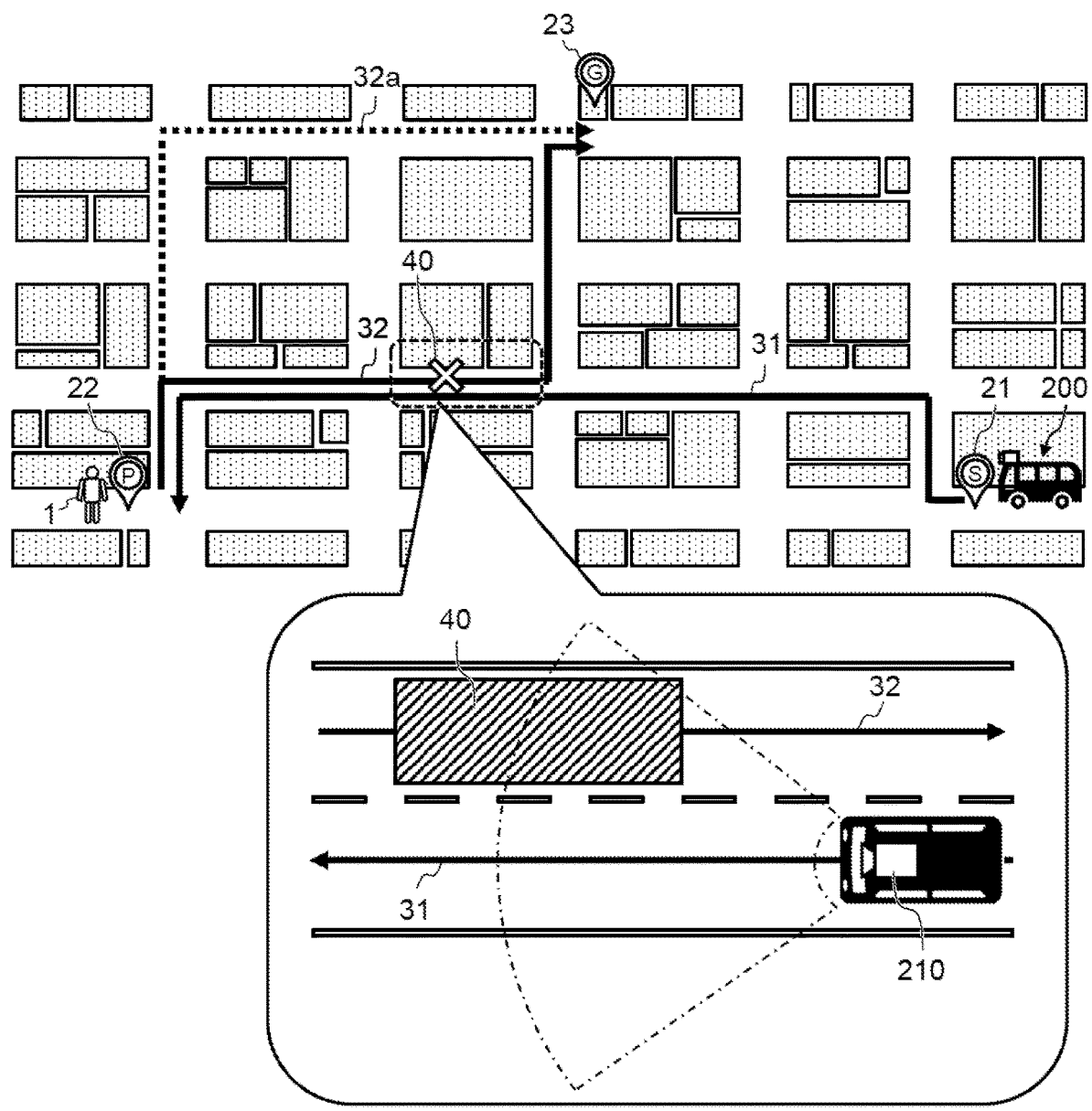
FIG. 4 is a conceptual diagram for explaining a process executed by the vehicle dispatch server.

Let's consider a case where the vehicle dispatch server 100 generates the dispatch route 31 and the transportation route 32. And consider that the autonomous vehicle 200 is autonomously traveling along the dispatch route 31. FIG. 4 shows that case. And in FIG. 4, the transportation route 32 includes an avoidance point 40. The avoidance point 40 is, for example, a point that could not be recognized from the database information when the vehicle dispatch server 100 generated the transportation route 32. For example, the avoidance point 40 is a point caused by a factor that did not appear at the time when the transportation route 32 was generated or a point that could not be recognized because the database was not updated. Concretely, examples of the avoidance point 40 include an impassable point due to an accident or a temporarily stopped vehicle, a construction section, a congested section, and a point where a road shape or surrounding structures has changed. The avoidance point 40 can also be referred to as a "non-drivable point".

In FIG. 4, the avoidance point 40 is located on a portion overlapping the dispatch route 31 in the transportation route 32. Therefore, the autonomous vehicle 200 can detect the surrounding environment information about the avoidance point 40 by the sensor 210 while traveling on the dispatch route 31. Then, by transmitting the surrounding environment information about the avoidance point 40 to the database server 400, the vehicle dispatch server 100 can determine that the avoidance point 40 is included in the transportation route 32. Particularly, the vehicle dispatch server 100 can also determine the avoidance point 40 that could not be recognized from the database information at the time when the transportation route 32 was generated.

Next, the vehicle dispatch server 100 changes the transportation route 32 so as not to include the avoidance point 40 when it is determined that the transportation route 32 includes the avoidance point 40. For example, as shown in FIG. 4, the vehicle dispatch server 100 changes the transportation route 32 to another transportation route 32a that does not include the avoidance point 40.

In this way, the vehicle dispatch server 100 changes the transportation route 32 in response to the avoidance point being included in the transportation route 32. Then, the vehicle dispatch server 100 transmits the selected or changed transportation route 32 to the autonomous vehicle 200 as the dispatch plan. The vehicle dispatch server 100 may be configured to perform transmission each time when the transportation route 32 is selected or changed. Or the vehicle dispatch server 100 may be configured to perform transmission of the selected or changed transportation route 32 at a time point when the autonomous vehicle 200 completes traveling on the dispatch route 31 (for example, a time point when the autonomous vehicle 200 arrives at the pick-up point 22).

Although FIG. 4 shows a case where the avoidance point 40 affects only the transportation route 32, it is conceivable that the avoidance point 40 also affects the dispatch route 31. In such a case, the vehicle dispatch server 100 may change the dispatch route 31 so as to avoid the avoidance point 40, or dispatch the other autonomous vehicle 200 to the pick-up point 22. In order to cope with such a case, the vehicle dispatch server 100 may be configured to generate a plurality of candidate dispatch routes after adding a margin time to the pick-up request time.

2. Configuration

Figure 5:
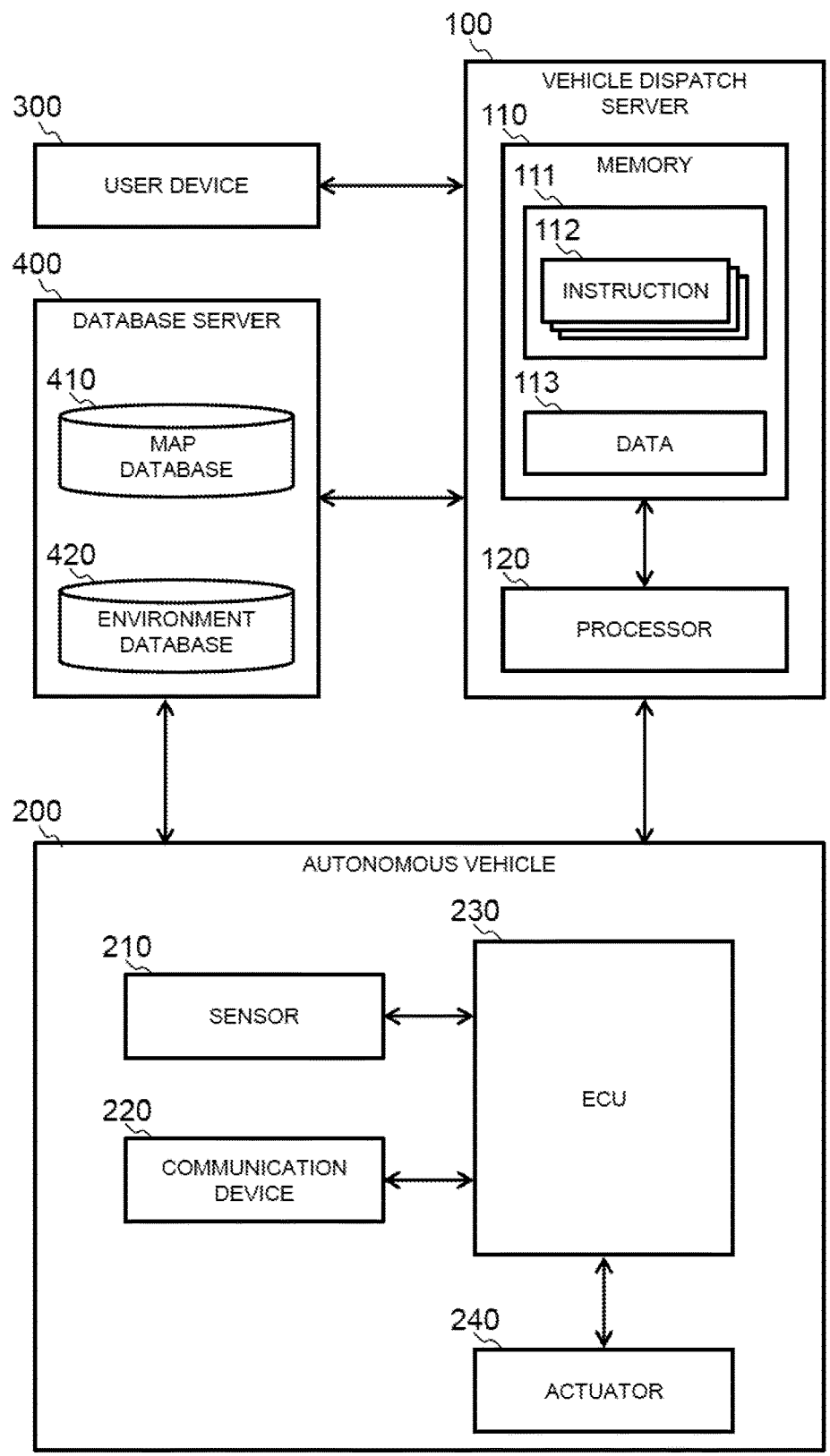
FIG. 5 is a block diagram showing a configuration of the vehicle dispatch system according to the present embodiment.

The following will describe a configuration of the vehicle dispatch system 10 according to the present embodiment. FIG. 5 is a block diagram showing a configuration of the vehicle dispatch system 10 according to the present embodiment.

The vehicle dispatch server 100 is a computer including a memory 110 and a processor 120. The memory 110 is coupled to the processor 120, and stores instructions 112 executable by the processor 120 and various data 113 required for execution of processing. The instructions 112 are provided by a computer program 111 (vehicle dispatch program). Particularly, the computer program 111 may be recorded on a non-transitory computer readable medium included in the memory 110. Information acquired by the vehicle dispatch server 100 when executing processes is stored as data 113 in the memory 110.

The instructions 112 are configured to cause the processor 120 to execute various processes. That is, by the processor 120 operating in accordance with the instructions 112, various processes are realized. The processes executed by the processor 120 in accordance with the instructions 112 will be described below.

The vehicle dispatch server 100 may be configured by a plurality of computers. In this case, the vehicle dispatch server 100 may include a plurality of memories and a plurality of processors.

The database server 400 manages a map database 410 and an environment database 420. The database server 400 may be configured to manage other databases necessary for providing the vehicle dispatch service.

The autonomous vehicle 200 include the sensor 210, a communication device 220, a ECU 230, and an actuator 240.

The sensor 210 includes at least a sensor that detects the surrounding environment of the autonomous vehicle 200. In addition, the sensor 210 may include a sensor that detects a traveling state (vehicle speed, acceleration, yaw rate, or the like) of the autonomous vehicle 200, such as a vehicle speed sensor, an accelerometer, or a gyro scope. Information detected by the sensor 210 is transmitted to the ECU 230.

The communication device 220 communicates with a device external to the autonomous vehicle 200 and transmits/receives information. In particular, the communication device transmits/receives information via the communication network 2. For example, the communication device 220 receives the dispatch plan and transmits the surrounding environment information. In this case, the communication device 220 is typically a device that performs wireless communication with a wireless base station. Other examples of the communication device 220 include a device that communicates with surrounding vehicles, a GPS receiver, and the like. Information received by the communication device 220 is transmitted to the ECU 230. Examples of the information received by the communication device 220 include the dispatch plan, map information, and GPS position information.

Based on the acquired information, the ECU 230 executes a process for autonomous driving control (autonomous driving process) and generates control signals. Typically, the ECU 230 comprises a memory and a processor. The processor operates in accordance with executable instructions stored in the memory, thereby realizing execution of the process for autonomous driving control. The control signals generated by the ECU 230 are transmitted to the actuator 240.

In particular, the ECU 230 is configured to execute a process of causing the autonomous vehicle 200 to autonomously travel along the traveling routes (the dispatch route 31 and the transportation route 32) given by the dispatch plan. Typically, the ECU 230 generates tracks on the traveling routes based on the acquired information. Then, the ECU 230 generates the control signals related to acceleration, steering, and braking so that the autonomous vehicle 200 travels along the generated tracks. A suitable known technique may be employed as a configuration of processing for generation of the tracks and generation of the control signals related to acceleration, steering, and braking.

Furthermore, the ECU 230 executes a process of evaluating the traveling route of the autonomous vehicle 200 (traveling route evaluation process) based on information detected by the sensor 210. For example, in the traveling route evaluation process, the ECU 230 evaluates the conditions of a lane on which the vehicle travels, an opposite lane, an intersection through which the vehicle passes, and the like. By the ECU 230 executing the traveling route evaluation process, information regarding a traveling route recognized based on the information detected by the sensor 210 is generated. The information generated in the traveling route evaluation process is transmitted to the database server 400 via the communication device 220 as the surrounding environment information.

The actuator 240 operate in accordance with the control signals transmitted from the ECU 230. Examples of the actuator 240 include an actuator related to an operation of a power unit (an internal combustion engine, an electric motor, or the like), an actuator related to an operation of a brake mechanism, an actuator related to an operation of a steering mechanism, and the like. The actuator 240 operates in accordance with the control signals, thereby realizing autonomous driving of the autonomous vehicle 200.

Figure 6:
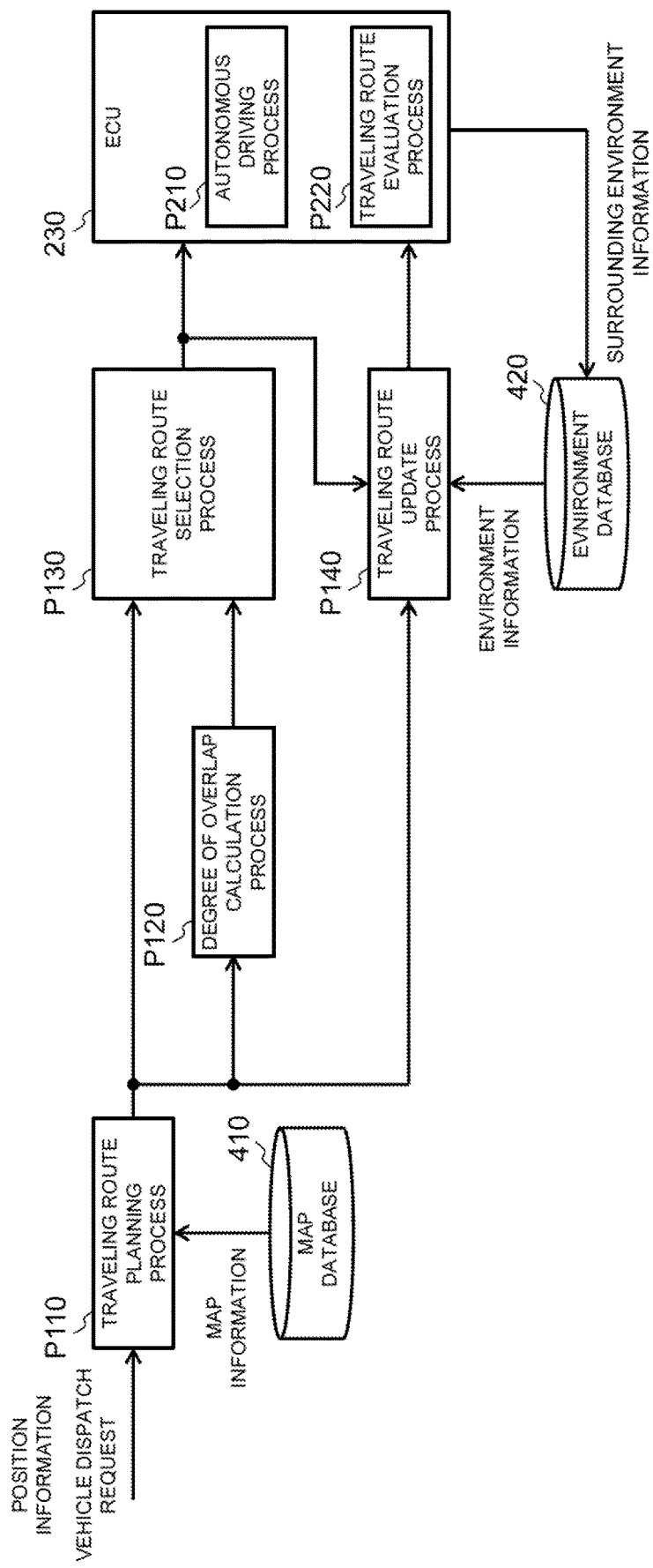
FIG. 6 is a block diagram showing a configuration of processes executed by the vehicle dispatch system according to the present embodiment.

Next, a configuration of processes executed in the vehicle dispatch system 10 according to the present embodiment will be described with reference to FIG. 6. The processes executed in the vehicle dispatch system 10 includes a traveling route planning process P110, a degree of overlap calculation process P120, a traveling route selection process P130, and a traveling route update process P140.

The traveling route planning process P110, the degree of overlap calculation process P120, the traveling route selection process P130, and the traveling route update process P140 are realized by the processor 120 operating in accordance with the instructions 112.

The traveling route planning process P110 generates a plurality of candidate transportation routes and a plurality of candidate dispatch routes based on position information of the autonomous vehicle 200, a vehicle dispatch request, and map information. Furthermore, the traveling route planning process P110 calculates a estimated travel time for each of the plurality of candidate transportation routes. The traveling route planning process P110 links information of the estimated travel time with each of the plurality of candidate transportation routes. Alternatively, the traveling route planning process P110 may index the plurality of candidate transportation routes in descending order of the estimated travel time. The traveling route planning process P110 further generates a plurality of candidate dispatch routes such that the autonomous vehicle 200 arrives in time for a pick-up request time included in the vehicle dispatch request.

The degree of overlap calculation process P120 calculates a degree of overlap to the transportation route 32 for each of the plurality of candidate dispatch routes. Here, the transportation route 32 is typically a traveling route having the shortest estimated travel time among the plurality of candidate transportation routes. The transportation route 32 is selected in the traveling route selection process P130 as described below. Then, the degree of overlap calculation process P120 may be configured to acquire the transportation route 32 from the traveling route selection process P130.

The traveling route selection process P130 selects the dispatch route 31 from the plurality of candidate dispatch routes based on the degree of overlap calculated by the degree of overlap calculation process P120. Typically, the traveling route selection process P130 selects, as the dispatch route 31, a traveling route having the largest degree of overlap among the plurality of candidate dispatch routes. Further, the traveling route selection process P130 selects the transportation route 32 from the plurality of candidate transportation routes based on a degree of shortness of the estimated travel time. The dispatch route 31 and the transportation route 32 selected by the traveling route selection process P130 are transmitted to the ECU 230 as the dispatch plan.

The traveling route update process P140 determines whether or not the avoidance point 40 is included in the transportation route 32 based on environment information. Then, when it is determined that the transportation route 32 includes the avoidance point 40, the traveling route update process P140 changes the transportation route 32. Typically, the traveling route update process P140 changes the transportation route 32 such that it is a traveling route which does not include the avoidance point 40 and has the shortest estimated travel time among the plurality of transport candidate transportation routes. Information of the transportation route 32 changed by the traveling route update process P140 is transmitted to the ECU 230.

The ECU 230, by executing the autonomous driving process P210, causes the autonomous vehicle 200 to autonomously travel along the dispatch route 31 and the transportation route 32 acquired as the dispatch plan. In addition, information generated by the ECU 230 executing the traveling route evaluation process P220 is managed by the environment database 420 as the surrounding environment information. The surrounding environment information managed by the environment database 420 may include information directly detected by the sensor 210.

3. Process

The following will describe processes executed by the vehicle dispatch server 100 and operations of the autonomous vehicle 200 in the vehicle dispatch system 10 according to the present embodiment.

Figure 7:
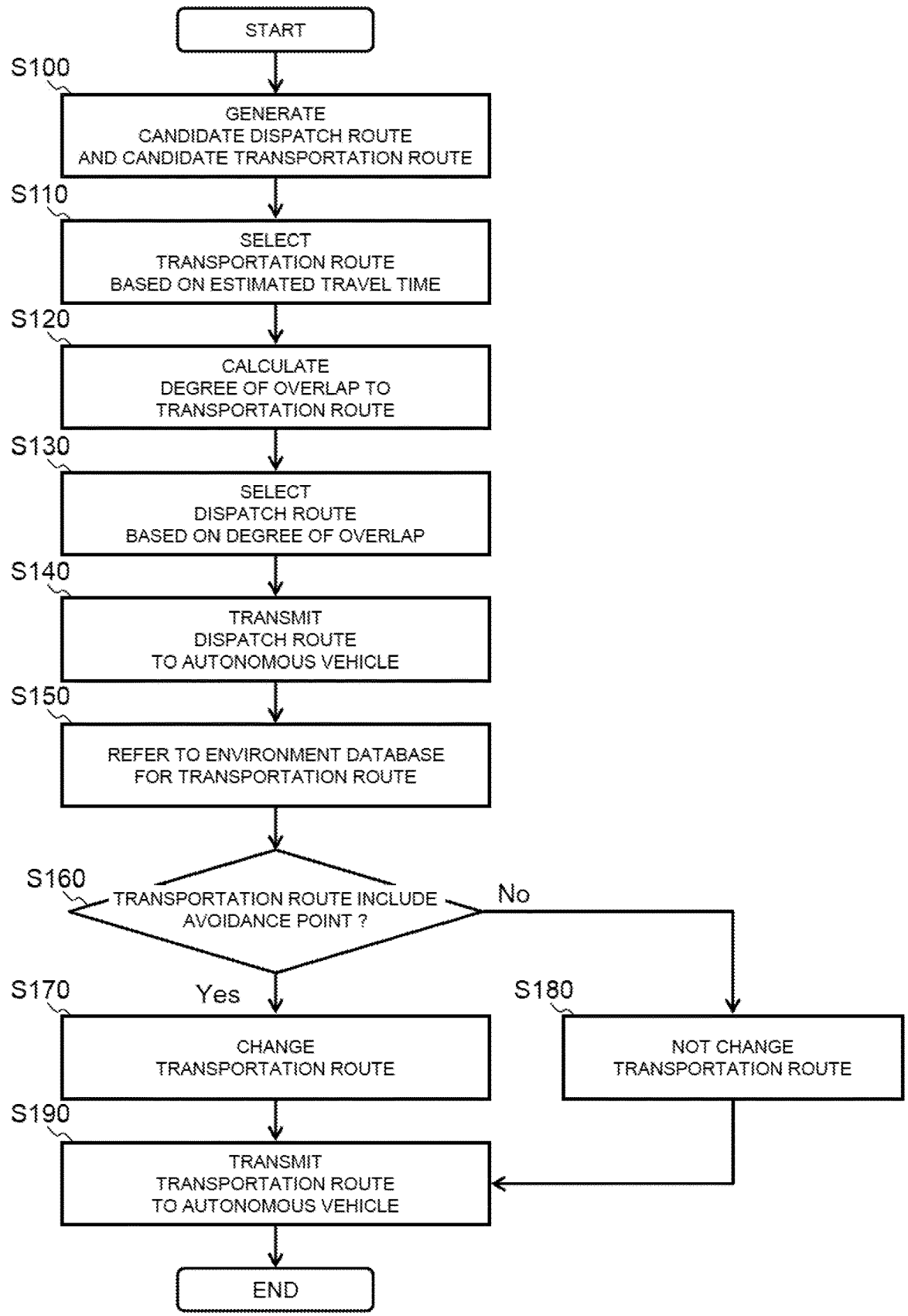
FIG. 7 is a flowchart showing processes executed by the vehicle dispatch server according to the present embodiment.

First, the processes executed in the vehicle dispatch server 100 (more specifically, the processes executed by the processor 120) will be described. FIG. 7 is a flowchart showing the processes executed by the vehicle dispatch server 100. The flowchart shown in FIG. 7 starts, for example, when the vehicle dispatch server 100 acquires a vehicle dispatch request.

In step S100, the vehicle dispatch server 100 generates a plurality of candidate dispatch routes and a plurality of candidate transportation routes in response to the vehicle dispatch request. The process related to step S100 is executed by the traveling route planning process P110. After step S100, the process proceeds to step S110.

In step S110, the vehicle dispatch server 100 selects the transportation route 32 from the plurality of candidate transportation routes generated in step S100 based on a degree of shortness of the estimated travel time. The process related to step S110 is executed by the traveling route selection process P130. After step S110, the process proceeds to step S120.

In step S120, the vehicle dispatch server 100 calculates a degree of overlap to the transportation route 32 selected in step S110 for each of the plurality of candidate dispatch routes generated in step S100. The process related to step S120 is executed by the degree of overlap calculation process P120. After step S120, the process proceeds to step S130.

In step S130, the vehicle dispatch server 100 selects the dispatch route 31 from the plurality of candidate dispatch routes generated in step S100 based on the degree of overlap calculated in step S120. The process related to step S130 is executed by the traveling route selection process P130. After step S130, the process proceeds to step S140.

In step S140, the vehicle dispatch server 100 transmits the dispatch route 31 selected in step S130 to the autonomous vehicle 200. After step S140, the process proceeds to step S150.

In step S150, the vehicle dispatch server 100 refers to the environment database 420 and acquires environment information of the transportation route 32. After step S150, the process proceeds to step S160.

In step S160, the vehicle dispatch server 100 determines whether or not the transportation route 32 includes the avoidance point 40.

When it is determined that the transportation route 32 includes the avoidance point 40 (step S160; Yes), the vehicle dispatch server 100 changes the transportation route 32 so as not to include the avoidance point 40 (step S170), and transmits the changed transportation route 32 to the autonomous vehicle 200 (step S190).

When it is determined that the transportation route 32 does not include the avoidance point 40 (step S160; No), the vehicle dispatch server 100 transmits the transportation route 32 to the autonomous vehicle 200 without changing the transportation route 32 (steps S180 and S190).

Here, the processes related to steps S150 to S180 are executed by the traveling route update process P140. The processes related to steps S150 to S190 may be repeatedly executed at predetermined intervals until the autonomous vehicle 200 start traveling along the transportation route 32. In this case, the process related to step S190 may be executed only when the transportation route 32 is changed. Alternatively, the process related to step S190 may be configured to be executed when the autonomous vehicle 200 arrives at the pick-up point 22.

In this way, the processes are executed by the vehicle dispatch server 100. And by the vehicle dispatch server 100 executing the processes described above, a traveling route generation method for generating a traveling route of an autonomous vehicle in response to a vehicle dispatch request is realized. Furthermore, the computer program 111 causing the processor 120 to execute the processes described above is realized.

Figure 8:
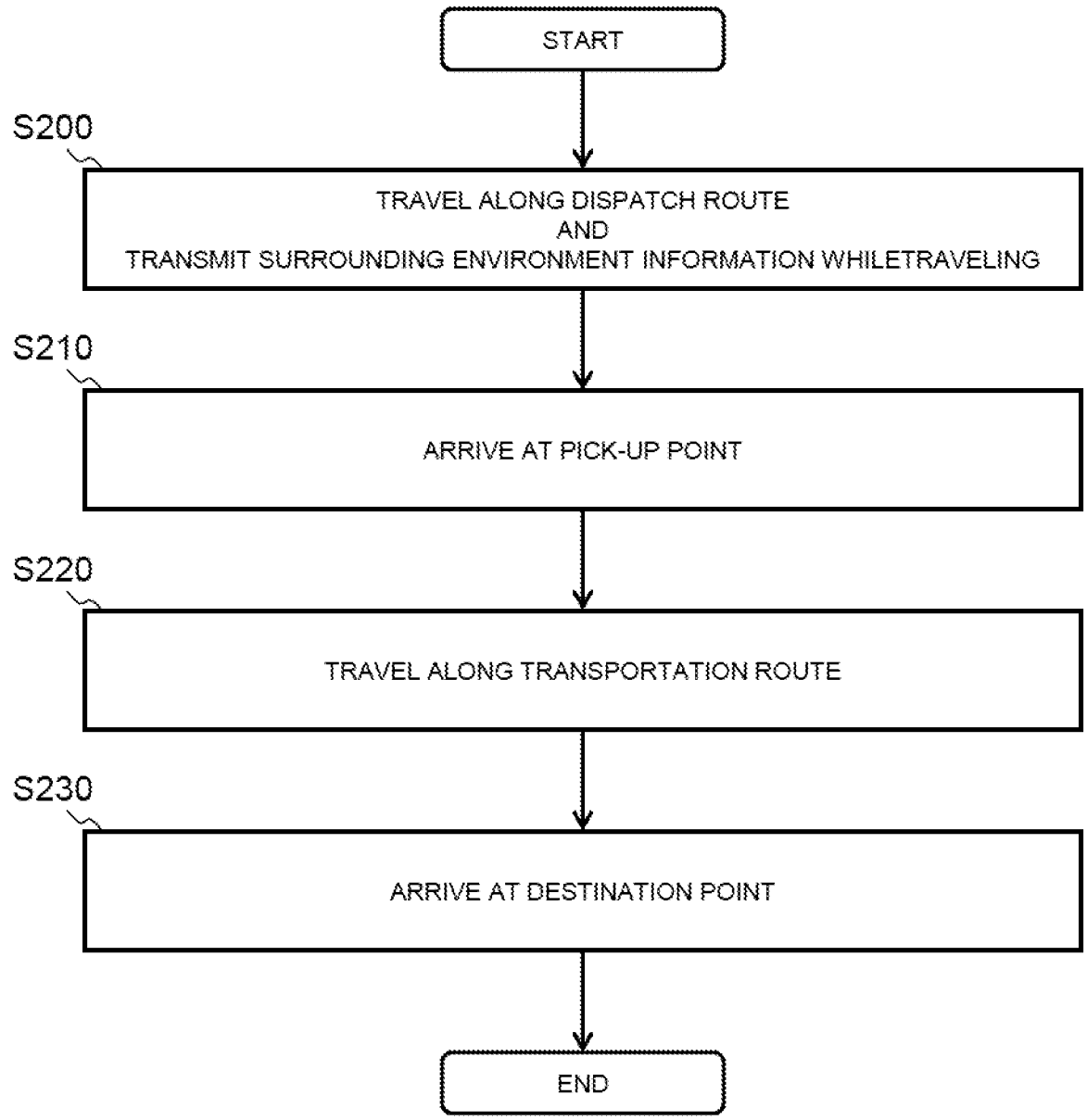
FIG. 8 is a flowchart showing operations of the autonomous vehicle in the vehicle dispatch system according to the present embodiment.

Next, the operations of the autonomous vehicle 200 in the vehicle dispatch system 10 will be described. FIG. 8 is a flowchart showing operations of the autonomous vehicle 200. The flowchart shown in FIG. 8 starts, for example, when the autonomous vehicle 200 receives a dispatch plan from the vehicle dispatch server 100.

In step S200, the autonomous vehicle 200 start traveling along the dispatch route 31. The autonomous vehicle 200 transmits surrounding environment information detected by the sensor 210 to the database server 400 at any time while traveling on the dispatch route 31.

After arriving at the pick-up point 22 (step S210), the autonomous vehicle 200 start traveling along the transportation route 32 (step S220). Here, before starting traveling along the transportation route 32, the autonomous vehicle 200 may inquire of the vehicle dispatch server 100 whether there is a change in the transportation route 32. Then, after the autonomous vehicle 200 arrives at the destination point 23 (step S230), the processes end.

4. Effect

As described above, according to the present embodiment, the dispatch route 31 is selected based on the degree of overlap to the transportation route 32. It is thus possible to determine whether or not the avoidance point 40 is included in the transportation route 32 based on the surrounding environment information detected by the sensor 210 while the autonomous vehicle 200 is traveling on the dispatch route 31. As a result, it is possible to determine the avoidance point 40 in the transportation route 32 caused by a dynamic factor or a real-time factor. Then, when it is determined that the transportation route 32 includes the avoidance point 40, the transportation route 32 is changed so as not to include the avoidance point 40. As a result, it is possible to reduce inclusion of the avoidance point 40 in the transportation route 32.

Note that, it is conceivable that the transportation route 32 is strongly limited depending on the vehicle dispatch request, whereas the dispatch route 31 only needs to satisfy that the autonomous vehicle 200 arrives in time for the pick-up request time. According to the present embodiment, the dispatch route 31 is selected, based on the degree of overlap, from the plurality of candidate dispatch routes generated such that at least the autonomous vehicle 200 arrives in the pick-up request time. Therefore, it is possible to select the dispatch route 31 that can sufficiently utilize the margin time until the pick-up request time while optimizing the range in which the transportation route 32 can be evaluated.

Furthermore, according to the present embodiment, the transportation route 32 is selected based on the degree of shortness of the estimated travel time. This makes it possible to improve the convenience of the user 1.

The vehicle dispatch system 10 according to the present embodiment can also be applied to a case where a plurality of autonomous vehicles are dispatched. In this case, each dispatch route 31 of the plurality of autonomous vehicles may be selected such that the degree of overlap to the entire transportation routes of the plurality of autonomous vehicles.

What is claimed is:

1. A vehicle dispatch system comprising: one or more processors; and a memory storing executable instructions that, when executed by the one or more processors, cause the one or more processors to execute: acquiring a vehicle dispatch request of an autonomous vehicle; generating a transportation route which is a traveling route from a pick-up point to a destination point in accordance with the vehicle dispatch request; generating a plurality of candidate dispatch routes for a dispatch route which is a traveling route from a current point of the autonomous vehicle to the pick-up point; calculating a degree of overlap between the transportation route and the dispatch route for each of the plurality of candidate dispatch routes; selecting the dispatch route from the plurality of candidate dispatch routes based on the degree of overlap; causing the autonomous vehicle to travel along the dispatch route; acquiring surrounding environment information along the dispatch route with a sensor of the autonomous vehicle while the autonomous vehicle travels along the dispatch route; determining, based on the surrounding environment information along the dispatch route, whether or not the transportation route includes an avoidance point where the autonomous vehicle should avoid passing through; and in response to determining that the transportation route includes the avoidance point, changing the transportation route so as not to include the avoidance point, and causing the autonomous vehicle to travel along the changed transportation route.

2. The vehicle dispatch system according to claim 1, wherein the vehicle dispatch request includes a pick-up request time at which the autonomous vehicle arrives at the pick-up point, and
the generating the plurality of candidate dispatch routes includes generating the plurality of candidate dispatch routes such that at least the autonomous vehicle arrives in time for the pick-up request time.

3. The vehicle dispatch system according to claim 1, wherein the generating the transportation route includes:
generating a plurality of candidate transportation routes for the traveling route from the pick-up point to the destination point in accordance with the vehicle dispatch request;
calculating estimated travel time of the autonomous vehicle for each of the plurality of candidate transportation routes; and
selecting the transportation route from the plurality of candidate transportation routes based on a degree of shortness of the estimated travel time.

4. A traveling route generation method for generating, by a computer, a traveling route of an autonomous vehicle in accordance with a vehicle dispatch request, the traveling route generation method comprising:
generating a transportation route which is a traveling route from a pick-up point to a destination point in accordance with the vehicle dispatch request;
generating a plurality of candidate dispatch routes for a dispatch route which is a traveling route from a current point of the autonomous vehicle to the pick-up point;
calculating a degree of overlap between the transportation route and the dispatch route for each of the plurality of candidate dispatch routes;
selecting the dispatch route from the plurality of candidate dispatch routes based on the degree of overlap;
causing, by one or more processors, the autonomous vehicle to travel along the dispatch route;

acquiring surrounding environment information along the dispatch route with a sensor of the autonomous vehicle while the autonomous vehicle travels along the dispatch route;

determining, based on the surrounding environment information along the dispatch route, whether or not the transportation route includes an avoidance point where the autonomous vehicle should avoid passing through; and in response to determining that the transportation route includes the avoidance point, changing the transportation route so as not to include the avoidance point, and causing the autonomous vehicle to travel along the changed transportation route.

5. A non-transitory computer readable recording medium on which a computer program for dispatching an autonomous vehicle in accordance with a vehicle dispatch request is recorded, the computer program, when executed by a computer, causing the computer to execute: generating a transportation route which is a traveling route from a pick-up point to a destination point in accordance with the vehicle dispatch request; generating a plurality of candidate dispatch routes for a dispatch route which is a traveling route from a current point of the autonomous vehicle to the pick-up point; calculating a degree of overlap between the transportation route and the dispatch route for each of the plurality of candidate dispatch routes; selecting the dispatch route from the plurality of candidate dispatch routes based on the degree of overlap; causing the autonomous vehicle to travel along the dispatch route; acquiring surrounding environment information along the dispatch route with a sensor of the autonomous vehicle while the autonomous vehicle travels along the dispatch route; determining, based on the surrounding environment information along the dispatch route, whether or not the transportation route includes an avoidance point where the autonomous vehicle should avoid passing through; and in response to determining that the transportation route includes the avoidance point, changing the transportation route so as not to include the avoidance point, and causing the autonomous vehicle to travel along the changed transportation route.

* * * * *